(12) United States Patent
Yokota et al.

(10) Patent No.: US 7,086,494 B2
(45) Date of Patent: Aug. 8, 2006

(54) POWER STEERING SYSTEM

(75) Inventors: Tadaharu Yokota, Kanagawa (JP);
Masakazu Kurata, Yokohama (JP);
Michiya Hiramoto, Yokohama (JP);
Yukio Sudo, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 11/104,507

(22) Filed: Apr. 13, 2005

(65) Prior Publication Data

US 2005/0173182 A1 Aug. 11, 2005

Related U.S. Application Data

(62) Division of application No. 10/389,766, filed on Mar. 18, 2003, now Pat. No. 6,886,657.

(30) Foreign Application Priority Data

Mar. 19, 2002 (JP) ............................. 2002-076009
Mar. 20, 2002 (JP) ............................. 2002-077413

(51) Int. Cl.
*B62D 5/06* (2006.01)
(52) U.S. Cl. ..................................... 180/441
(58) Field of Classification Search ............ 180/422, 180/417, 442; 60/476, 473; 91/435
See application file for complete search history.

(56) References Cited

U.S. PATENT DOCUMENTS

| 4,002,220 | A | 1/1977 | Wible |
| 5,934,406 | A | 8/1999 | Dvorak et al. |
| 5,950,757 | A | 9/1999 | Saita et al. |
| 5,975,232 | A | 11/1999 | Komatsu et al. |
| 6,041,883 | A | 3/2000 | Yokota et al. |
| 6,568,499 | B1 | 5/2003 | Nakazawa et al. |
| 6,880,668 | B1 * | 4/2005 | Sakaki et al. ............... 180/441 |

FOREIGN PATENT DOCUMENTS

JP 2001-1918 A 1/2001

* cited by examiner

*Primary Examiner*—Tony Winner
(74) *Attorney, Agent, or Firm*—Foley & Lardner LLP

(57) ABSTRACT

A power steering system for a vehicle. The system includes a hydraulic power cylinder, first and second hydraulic lines, a bypass passage through which the first and second hydraulic lines are connected with each other, and a flow passage change-over device adapted to close the bypass passage during steering assisting. A supply passage and a return passage are disposed in parallel with each other to form part of each of the first and second hydraulic lines. The flow passage change-over device is disposed in each of the first and second hydraulic lines. A differential pressure regulating valve is disposed in each of the return passages and adapted to allow hydraulic fluid to flow toward the hydraulic pressure source in a condition where pressure on side of the hydraulic power cylinder becomes higher than a set pressure or higher than pressure on side of the hydraulic pressure source.

4 Claims, 11 Drawing Sheets

POWER STEERING SYSTEM

The present application is a divisional of U.S. application Ser. No. 10/389,766, filed Mar. 18, 2003, now issued as U.S. Pat. No. 6,886,657 B2, the entire contents of which are incorporated herein by reference.

BACKGROUND OF THE INVENTION

This invention relates to improvements in a power steering system, and more particularly to the power steering system in which a steering assist force is developed by a hydraulic power cylinder.

A power steering system of the kind wherein a steering assist force is developed by a hydraulic power cylinder is disclosed in Japanese Patent Provisional Publication No. 2001-1918. This power steering system includes hydraulic lines (44a, 44b) which are connected respectively with left-side and right-side hydraulic pressure chambers of the hydraulic power cylinder. Relief valves (54a, 54b) are disposed respectively in hydraulic lines. These relief valves are adapted to allow hydraulic fluid to bypass the hydraulic line so as to direct the hydraulic fluid to another oil passage when the internal pressure of a hydraulic circuit becomes a certain level or higher, thereby preventing the hydraulic circuit from becoming into an overload condition.

However, in the above conventional power steering system, the internal pressure of the hydraulic circuit for connecting the left-side and right-side hydraulic pressure chambers of the hydraulic power cylinder becomes a level of generally atmospheric pressure during non-steering assisting in which an oil pump is not operated, and therefore the hydraulic power cylinder is unavoidably readily moved when kickback is input to the hydraulic power cylinder from road surface so that steering tends to become unstable. Additionally, since the pressure within the hydraulic circuit becomes the level of generally atmospheric pressure during the non-steering assisting, a time is required until the hydraulic pressure within the hydraulic circuit sufficiently rises after start of operation of the oil pump during steering assisting, so that operational delay of the hydraulic power cylinder occurs. More specifically, although hydraulic fluid within the hydraulic circuit is an incompressive fluid, air bubbles mixed in hydraulic fluid cannot sufficiently disappear until the hydraulic pressure becomes a set level or higher. Accordingly, the pressure of the hydraulic power cylinder cannot abruptly rise until the hydraulic pressure within the hydraulic circuit sufficiently rises so that air bubbles disappear. This causes the operational delay of the hydraulic power cylinder.

Further, it is necessary to set the valve opening pressure of the above-mentioned relief valve at a high level in order to prevent the relief valve from opening under the internal pressure of the hydraulic circuit during normal steering, and therefore the internal pressure of the hydraulic circuit rises to the level of the valve opening pressure of the relief valve at the highest. In case of making steering assist under this condition, in order to generate a steering assist force upon developing a pressure differential between the left-side and right-side hydraulic pressure chambers of the hydraulic power cylinder, the oil pump is required to provide a higher pumping pressure than that under a condition where the internal pressure of the hydraulic circuit is low. As a result, it is necessary to set a driving current for an electric motor for the oil pump (reversible pump) at a higher level. This causes an increased electric power consumption. Additionally, setting the driving current at the higher level increases a heating value of the electric motor and driving elements, thereby providing a fear of putting the hydraulic circuit into an overheat condition.

SUMMARY OF THE INVENTION

It is an object of the present invention to provide an improved power steering system which can effectively overcome drawbacks encountered in conventional power steering systems.

Another object of the present invention is to provide an improved power steering system in which operational fluctuation of a hydraulic power cylinder can be suppressed during non-steering assisting, while operational response of the hydraulic power cylinder can be increased during steering assisting.

A further object of the present invention is to provide an improved power steering system in which stability of steering can be improved, while response of steering assisting can be improved.

A still further object of the present invention is to provide an improved power steering system in which a hydraulic circuit can be prevented from becoming into an overload condition, while driving energy for a reversible pump can be decreased thereby preventing the hydraulic circuit from becoming into an overheat condition.

An aspect of the present invention resides in a power steering system which comprises a steering shaft connected to a steering mechanism. A hydraulic power cylinder is provided for assisting a steering effort of the steering mechanism, the hydraulic power cylinder having first and second hydraulic pressure chambers. A reversible pump is provided having first and second discharge ports which are respectively connected through first and second hydraulic lines with the first and second hydraulic pressure chambers of the hydraulic power cylinder so that the first and second hydraulic pressure chambers are respectively provided with hydraulic pressures. A driving device is provided for driving the reversible pump to rightly and reversely rotate. A hydraulic circuit is constituted by the first and second hydraulic pressure chambers of the hydraulic power cylinder, the first hydraulic line, the second hydraulic line, and the reversible pump. A differential pressure regulating valve is disposed in the hydraulic circuit to maintain pressure at least in the first and second hydraulic lines at a level of atmospheric pressure or higher in an inoperative condition of the reversible pump.

Another aspect of the present invention resides in a power steering system which comprises a steering shaft connected to a steering mechanism. A hydraulic power cylinder is provided for assisting a steering effort of the steering mechanism, the hydraulic power cylinder having first and second hydraulic pressure chambers. A reversible pump is provided having first and second discharge ports which are respectively connected through first and second hydraulic lines with the first and second hydraulic pressure chambers of the hydraulic power cylinder so that the first and second hydraulic pressure chambers are respectively provided with hydraulic pressures. A driving device is provided for driving the reversible pump to rightly and reversely rotate. First and second communication passages are provided for connecting a hydraulic circuit with a reservoir tank, in which the hydraulic circuit includes the first and second hydraulic pressure chambers of the hydraulic power cylinder, the first hydraulic line, the second hydraulic line, and the reversible pump. A one-way valve is disposed in the first communication passage to allow hydraulic fluid to flow in a direction of from side of the reservoir tank to side of the hydraulic circuit. An orifice is disposed in the second communication passage. A differential pressure regulating valve is disposed in a part of the second communication passage between the orifice and the reservoir tank to allow hydraulic fluid to flow in a direction of from the side of the hydraulic circuit to the side of the reservoir tank.

A further aspect of the present invention resides in a power steering system which comprises a hydraulic power cylinder including a piston for defining first and second hydraulic pressure chambers. Hydraulic fluid is supplied to or discharged from each of the first and second hydraulic chambers under action of a hydraulic pressure source to hydraulically operate the piston so as to accomplish steering assisting. First and second hydraulic lines are provided to be respectively connected to first and second hydraulic pressure chambers of the hydraulic power cylinder, the first and second hydraulic lines being connected to the hydraulic pressure source. A bypass passage is provided such that the first and second hydraulic lines are connected with each other through the bypass passage. A flow passage change-over device is provided to be adapted to close the bypass passage during steering assisting under the action of the hydraulic pressure source and to open the bypass passage during non-steering assisting. In the power steering system, a supply passage and a return passage are disposed in parallel with each other to form part of each of the first and second hydraulic lines, the supply passage and the return passage being connected to the hydraulic pressure source and to each of the first and second hydraulic pressure chambers of the hydraulic power cylinder. Further in the power steering system, the flow passage change-over device is disposed in each of the first and second hydraulic lines. The flow passage change-over device includes a valve member which is adapted to open or close each of the supply passage and the bypass passage in accordance with a pressure differential between pressure at side of the hydraulic pressure source and pressure at side of the hydraulic power cylinder in the hydraulic pressure line in which the flow passage change-over device is disposed. Further in the power steering system, a differential pressure regulating valve is disposed in each of the return passages and adapted to allow hydraulic fluid to flow toward the hydraulic pressure source in a condition where pressure on side of the hydraulic power cylinder becomes higher a set pressure or higher than pressure on side of the hydraulic pressure source.

The other objects and features of this invention will become understood from the following description with reference to the accompanying drawings.

BRIEF DESCRIPTION OF THE DRAWINGS

In the drawings, like reference numerals designate like parts and elements throughout all figures, in which.

DETAILED DESCRIPTION OF THE INVENTION

Figure 1:
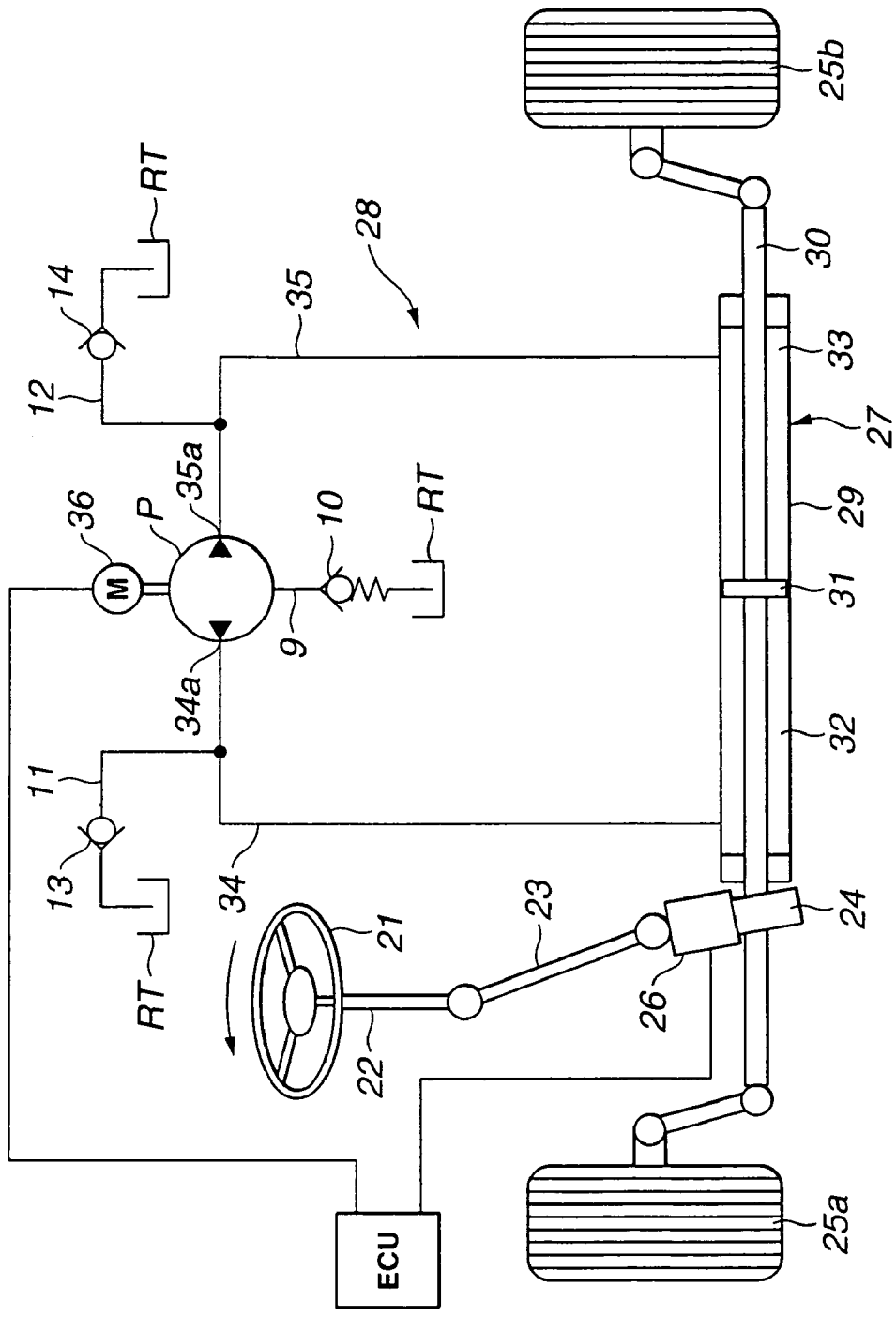
FIG. 1 is a hydraulic circuit diagram of a first embodiment of a power steering system according to the present invention.

Referring now to FIG. 1 of the drawings, a first embodiment of a power steering system according to the present invention is illustrated. The power steering system comprises a steering shaft 22 on which a steering wheel 21 is fixedly mounted as a steering effort input means. An output shaft 23 is connected to the lower end portion of steering shaft 22. A rack and pinion steering gear 24 is connected to the lower end portion of the output shaft 23 and forms part of a steering mechanism. A steering effort sensor 26 is provided at the lower end side of output shaft 23 to detect a rotational direction of steering shaft 22 and a steering effort applied to steering shaft 22. A hydraulic power cylinder 27 is connected to rack and pinion steering gear 24. A hydraulic circuit 28 is provided to supply a hydraulic pressure to hydraulic power cylinder 27.

Hydraulic power cylinder 27 includes a cylinder section 29 which extends in the direction of width of a vehicle body. A piston rod 30 is disposed in cylinder section 29 and axially extends so as to project outside of cylinder section 29 through opposite end walls (no numerals) of cylinder section 29. Piston rod 30 is connected to rack and pinion steering gear 24. A piston 31 is fixedly mounted on the piston rod 30 and disposed in cylinder section 29 in such a manner as to define a first (left-side) hydraulic pressure chamber 32 and a second (right-side) hydraulic pressure chamber 33 which are located on the opposite sides of piston 31. Left and right front road wheels 25a, 25b are rotatably connected through links (no numerals) to the left and right-side end sections of piston rod 30, respectively.

Hydraulic circuit 28 includes a first hydraulic line 34 and a second hydraulic line 35 which are respectively connected at their one ends to first and second hydraulic pressure chambers 32, 33. The other ends of first and second hydraulic lines 34, 35 are connected to the discharge ports 34a, 35a of a reversible (gear) pump P which is rightly and reversely rotatable or in both right and reverse directions (i.e., rotatable in a first direction and a second direction opposite to the first direction) under drive of an electric motor (as a driving device or means) 36 connected to the pump P. First and second hydraulic lines 34, 35 are connected to a reservoir tank RT in which hydraulic fluid is stored.

Arrangement of reversible pump P will be discussed with reference to FIG. 2. The reversible pump P includes a pump head 1 having a first end face to which electric motor 36 is fastened with bolts 36a. A gear case 2 and a side plate 3 are fastened to a second end face (opposite to the first end face) of pump head 1 with bolts (not shown). Additionally, reservoir tank RT is fastened to the second end face of pump head 1 with bolts (not shown) in such a manner as to cover gear case 2 and side plate 3.

A driving gear 4 and a driven gear 5 are rotatably accommodated in a condition to be engaged with each other within a pump chamber (no numeral) defined within gear case 2 and between pump head 1 and side plate 3. Driving gear 4 and driven gear 5 have respectively rotatable shafts 4a, 5a each of which has opposite end sections which extend oppositely from the opposite sides surfaces of driving gear 4 or driven gear 5. The opposite end sections of the rotatable shaft 4a are respectively disposed in bearing bores 1a, 3a which are respectively formed in pump head 1 and side plate 3. Similarly, the opposite end sections of rotatable shaft 5a are respectively disposed in bearing bores 1b, 3b which are respectively formed in pump head 1 and side plate 3. The opposite end sections of rotatable shaft 4a are respectively rotatably supported through bearings 6, 6 on the peripheral walls of the bearing bores 1a, 3a. Similarly, the opposite end sections of the rotatable shaft 5a are respectively rotatably supported through bearings 6, 6 on the peripheral walls of the bearing bores 1b, 3b.

One end of rotatable shaft 4a of driving gear 4 extends axially to form an extended section (no numeral) and connected to a rotatable shaft 36b of electric motor 36 through a rotatable connector 7 located inside an axial through-hole 1c formed in pump head 1. An annular rotating seal member 8 is disposed between the outer peripheral surface of the extended section of rotatable shaft 4a and the inner peripheral surface defining the above-mentioned through-hole, of pump head 1 so as to provide an liquid-tight seal between the major part of a through-hole 1c and bearing bore 1a.

Bearing bores 1a, 1b, 3a, 3b are communicated at their lower portions with a drain passage (or a second communication passage) 9. Drain passage 9 is communicated through a differential pressure regulating valve 10 with the inside of the reservoir tank RT. In other words, differential pressure regulating valve 10 is located near an end portion of drain passage 9 which end portion opens to the reservoir tank RT. Differential pressure regulating valve 10 functions to allow the hydraulic fluid to flow in a direction from the side of drain passage 9 to the side of reservoir tank RT. Differential pressure regulating valve 10 includes a spherical valve member 10a movably disposed in a generally cylindrical body (no numeral) having an axial bore. Spherical valve member 10 is biased in a direction to close the axial bore by a spring 10b so that differential pressure regulating valve 10 makes its closing action at a certain pressure of the hydraulic fluid. Differential pressure regulating valve 10 makes its opening action at a certain pressure (or a valve opening pressure) or higher of the hydraulic fluid applied to the differential pressure regulating valve. In this embodiment, the valve opening pressure is set at 5 kg/cm².

In this embodiment, a slight sliding clearance k1 is formed between one of the axially side surfaces of driving gear 4 and the sliding surface of pump head 1. A similar slight sliding clearance k2 is formed between the other of the axially side surfaces of driving gear 4 and the sliding surface of side plate 3. A similar slight sliding clearance k1 is formed between one of the axially side surfaces of driven gear 5 and the sliding surface of pump head 1. A similar slight sliding clearance k2 is formed between the other of the axially side surfaces of driven gear 5 and the sliding surface of side plate 3. It will be understood that the hydraulic fluid leaks through each clearances k1, k2. Additionally, each of clearances k1, k2 is in communication with the pump chamber and with bearing bores 1a, 1b, 3a, 3b in which the end sections of the rotatable shafts 4a, 5a are rotatably disposed. As a result, first and second hydraulic lines 34, 35 of hydraulic circuit 28 are communicated with drain passage 9 through the clearance of the bearings 6 disposed in the bearing bores 1a, 1b, 3a, 3b and sliding clearances k1, k2. It is to be noted that sliding clearances k1, k2 are narrowed to such an extent to allow a slight amount of the hydraulic fluid to leak, and therefore serve as an orifice for narrowing drain passage 9.

Thus, the above arrangement establishes a condition in which the pump chamber of the reversible pump P constituting part of hydraulic circuit 28 is communicated with drain passage 9 through sliding clearances k1, k2 of reversible pump P and the bearing bores 1a, 1b, 3a, 3b.

Furthermore, hydraulic fluid supply passages (first communication passages) 11, 12 are respectively connected to first and second hydraulic lines 34, 35. First hydraulic line 34 is communicable through supply passage 11 with reservoir tank RT. Second hydraulic line 35 is communicable through supply line 12 with reservoir tank RT. A one-way valve 13 is disposed in supply line 11 so as to allow the hydraulic fluid to flow in a direction from the side of reservoir tank RT to the side of first hydraulic line. A one-way valve 14 is disposed in supply line 12 so as to allow the hydraulic fluid to flow in a direction from the side of reservoir tank RT to the side of second hydraulic line 35.

The electric motor 36 is arranged to be controlled to rightly and reversely rotate or rotate in both right and reverse directions (i.e., rotate in a first direction and a second direction opposite to the first direction) under the action of a control current or signal output from an electronic control unit ECU including a microcomputer (not shown). This electronic control unit ECU is adapted to make its operation in accordance with information signals such as those representative of steering input torque (or a torque applied to steering wheel 21). The information signals representative of the steering input torque is output from steering effort sensor 26.

Operation of the above first embodiment power steering system will be discussed together with advantageous effects of the present invention.

When a driver turns leftward steering wheel 21 as indicated by an arrow in FIG. 1, the above-mentioned electric motor 36 is, for example, controlled to rightly rotates under the action of the control signal from the control unit ECU, and therefore the reversible pump P is driven to rightly rotate. Consequently, the reversible pump P discharges the hydraulic fluid which is supplied through first hydraulic line 34 to first hydraulic pressure chamber 32 of hydraulic power cylinder 27, and simultaneously the hydraulic fluid in second hydraulic pressure chamber 33 of hydraulic power cylinder 27 is sucked through hydraulic line 35 into reversible pump P under the suction of reversible pump P.

Thus, supply and discharge of hydraulic pressure are simultaneously made into and from first and second hydraulic pressure chambers 32, 33, so that an assisting force is added to the driver's steering effort to turn leftward steering wheel 21. By this, the load for the leftward turning of the steering wheel is lightened thereby improving the operationability of steering wheel 21.

In this embodiment, as discussed above, the orifice constituted by the sliding clearances k1, k2 is disposed in the drain passage (the second communication passage) 9 through which first and second hydraulic pressure lines 34, 35 constituting part of hydraulic circuit 28 is in communication with the reservoir tank RT. Additionally, differential pressure regulating valve 10 is proved to drain passage 9 between the orifices and the reservoir tank RT so as to allow the hydraulic fluid to flow in the direction of from the side of first and second hydraulic pressure lines 34, 35 to the side of the reservoir tank RT. Accordingly, by setting the valve opening pressure of this differential pressure regulating valve 10 at about 5 kg/cm$^2$, this differential pressure regulating valve 10 opens when the internal pressure of hydraulic circuit 28 exceeds the valve opening pressure (5 kg/cm$^2$), thereby preventing hydraulic circuit 28 from falling into an overload condition.

Figure 3:
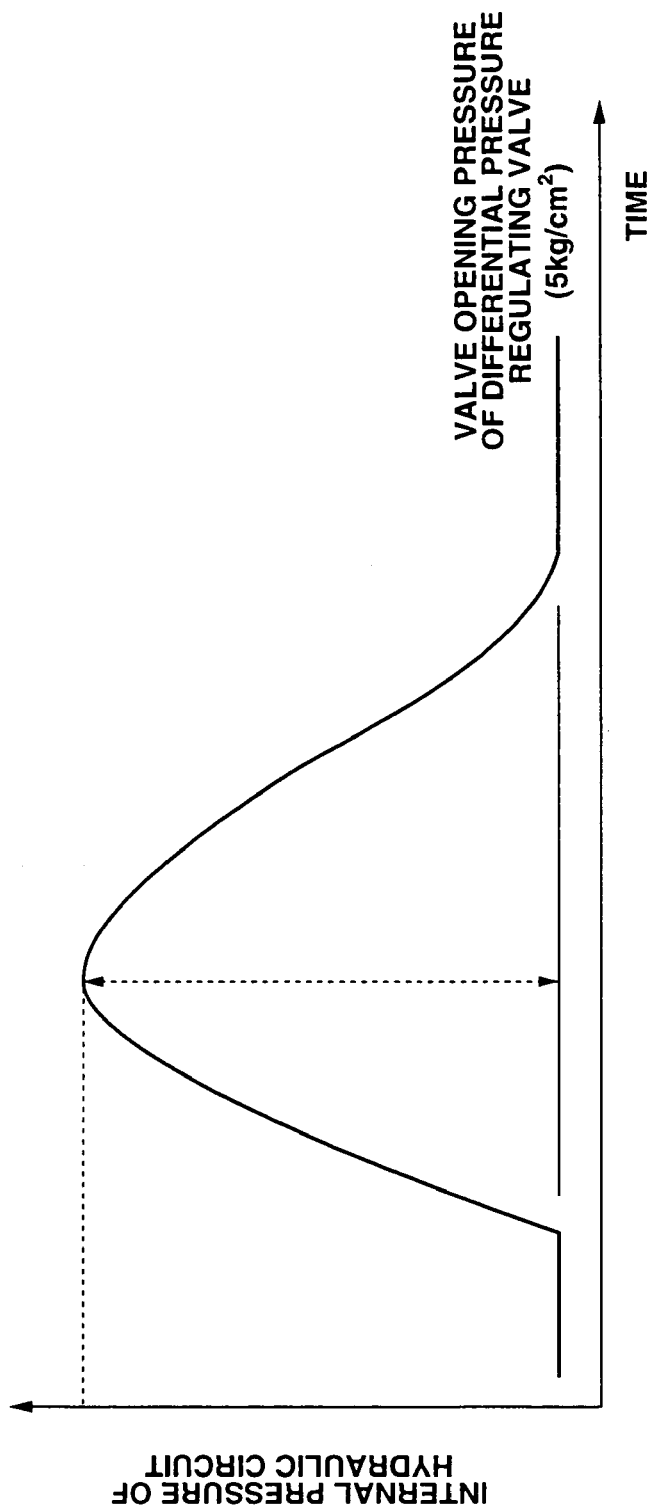
FIG. 3 is a time chart showing internal pressure of a hydraulic circuit used in the power steering system of FIG. 1.

During stopping of reversible pump P (and electric motor 36) or during driver's non-turning of steering wheel 21, the internal pressure of the hydraulic circuit 28 becomes equal to the pressure on the downstream side of the orifice constituted by the clearances k1, k2 (i.e., on the upstream side of differential pressure regulating valve 10), so that the internal pressure of hydraulic circuit 28 is kept at 5 kg/cm$^2$ as the set valve opening pressure as shown in a time chart of FIG. 3. Additionally, this differential pressure regulating valve 10 is provided to hydraulic circuit 28 through the orifice constituted by the clearances k1, k2, and therefore the pressure acting on the differential pressure regulating valve 10 becomes much smaller than the discharge pressure of pump P so that it is possible to set the valve opening pressure of differential pressure regulating valve 10 at the lower value as mentioned above.

Hence, at re-starting of reversible pump P (and electric motor 36), a certain pressure differential can be developed between the first and second pressure chambers 32, 33 of hydraulic power cylinder 27 even at a lower pump discharge pressure of pump P. As a resalt, a desired steering assist amount can be obtained even at the lower pump discharge pressure of the pump P (i.e., even at a lower driving output of the motor 36). This makes it possible to set a driving electric power (or driving energy) for electric motor 36 at a lower value, thereby decreasing a consumed electric power, while the amount of generated heat of electric motor 36 and driving elements can be suppressed thereby preventing hydraulic circuit 28 from falling into an overheat condition.

Further, since it is sufficient that the discharge pressure of hydraulic pump P is smaller, the capacity of reversible pump P and electric motor 36 can be suppressed smaller, thereby enabling a cost-down for the power steering system.

Furthermore, as discussed above, since the orifice is constituted by the sliding clearances k1, k2 formed in the operating section of reversible pump P, the sliding clearances k1, k2 formed around the end faces of gears 4, 5 and inherently making leak of the hydraulic fluid inevitably from the structural viewpoint can be effectively used as the orifice. By this, a particular orifice and a particular orifice passage are not required to be formed thereby lowering the cost for the power steering system.

As discussed above, drain passage 9 is formed in such a condition that the pump chamber of the reversible pump P constituting part the hydraulic circuit 28 is communicated with drain passage 9 through the sliding clearances k1, k2 and bearing bores 1a, 1b, 3a, 3b. Accordingly, the hydraulic fluid flows into the bearing bores 1a, 1b, 3a, 3b provided with bearings 6, so that the bearings 6 are always in a condition to be lubricated with the hydraulic fluid.

Additionally, since differential pressure regulating valve 10 is provided on the downstream side of sliding clearances k1, k2, the leak amount of the hydraulic fluid from the pump chamber of reversible pump P can be decreased. When the inside of reversible pump P becomes into an overload condition, differential pressure regulating valve 10 opens thereby preventing an overload from being applied to the seal members and the like of reversible pump P.

Further, during non-steering assisting in which steering assist by hydraulic power cylinder 27 is not made, the pressures within hydraulic pressure chambers 32, 33 of hydraulic power cylinder 27 are kept at 5 kg/cm$^2$ as the valve opening pressure as shown in FIG. 3, so that rise of the hydraulic pressure at start of driver's steering operation is quickened during steering assisting in which steering assist by hydraulic power cylinder 27 is made, thereby improving an operational response of the hydraulic power cylinder. This improves the response of the steering assist while suppressing an easy movement of the hydraulic power cylinder under the action of kickback from road surface during non-steering assisting thus preventing fluctuation in steering. This improves stability of steering against the kickback action applied from road surface.

Hereafter, other embodiments of the power steering system will be discussed in which like parts and elements as those in the first embodiment are designated by like reference numerals thereby omitting explanations thereof, so that explanation will be made on the structure of only different parts.

Figure 2:
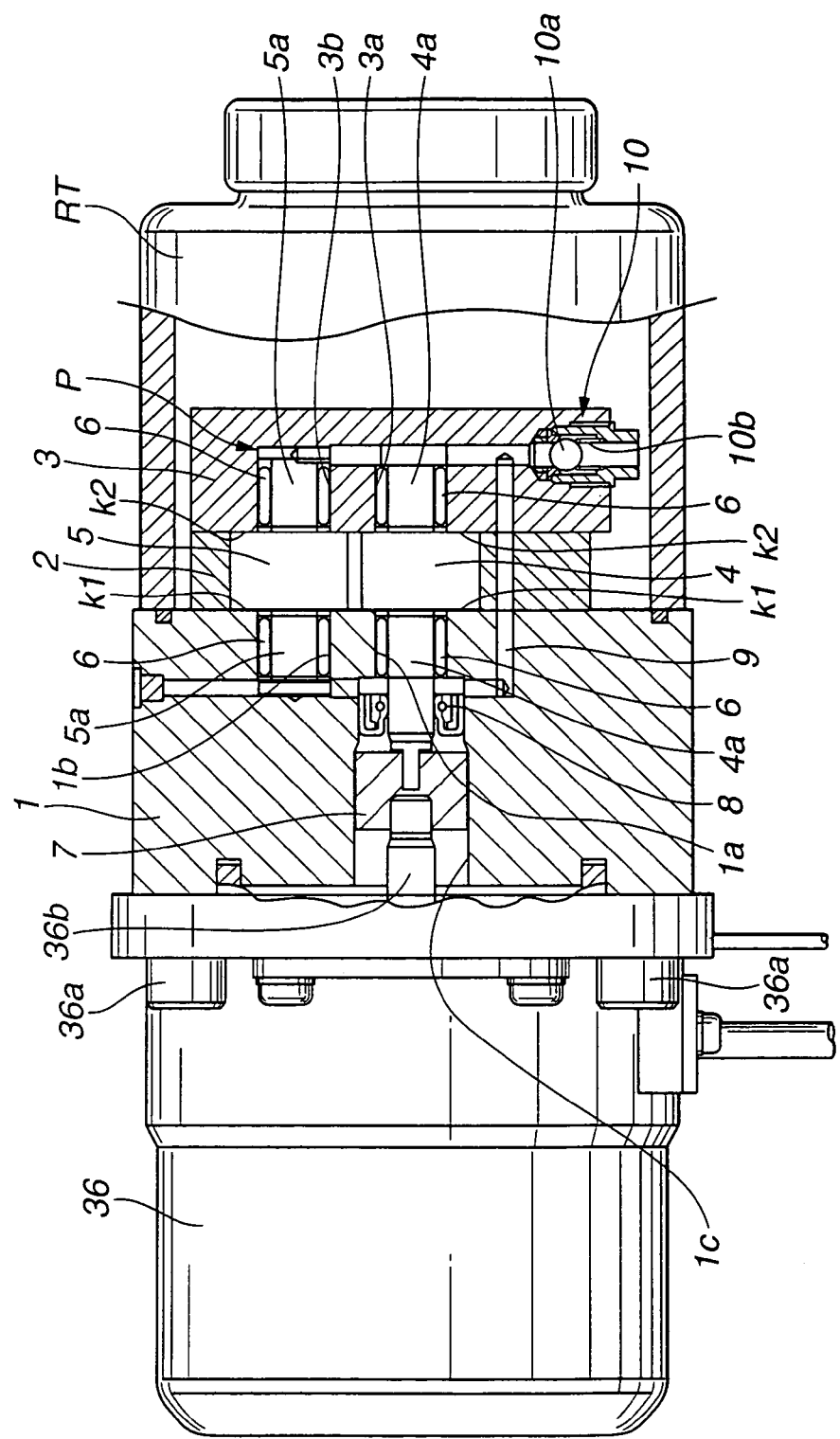
FIG. 2 is a front view, partly in section, of a reversible pump used in the power steering system of FIG. 1.
Figure 4:
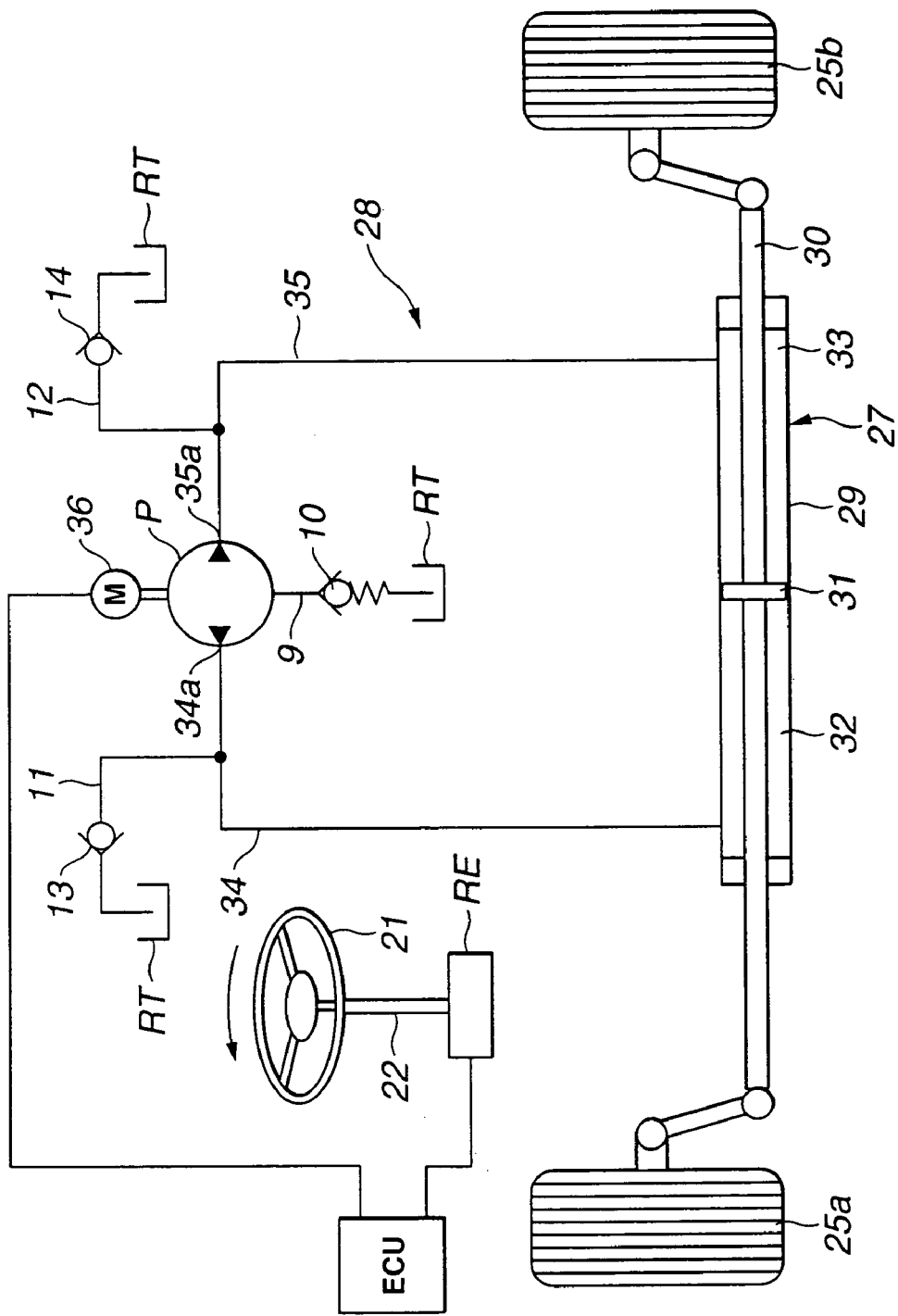
FIG. 4 is a hydraulic circuit diagram of a second embodiment of the power steering system according to the present invention.

FIG. 4 illustrates a second embodiment of the power steering system according to the present invention, similar to the first embodiment power steering system of FIGS. 1 to 3. In this embodiment, a rotary encoder RE is provided to steering shaft 22 so as to detect the rotational direction, the rotational speed and the rotational angle of steering wheel 21. Signals representative of the rotational direction, the rotational speed and the rotational angle of steering wheel 21 are output from rotary encoder RE to the control unit ECU. The control unit ECU controls the operation of electric motor 36 in accordance with the signals, thereby accomplishing steering and steering assisting in the power steering system. Accordingly, it will be understood that similar effects to those in the first embodiment can be obtained.

Figure 5:
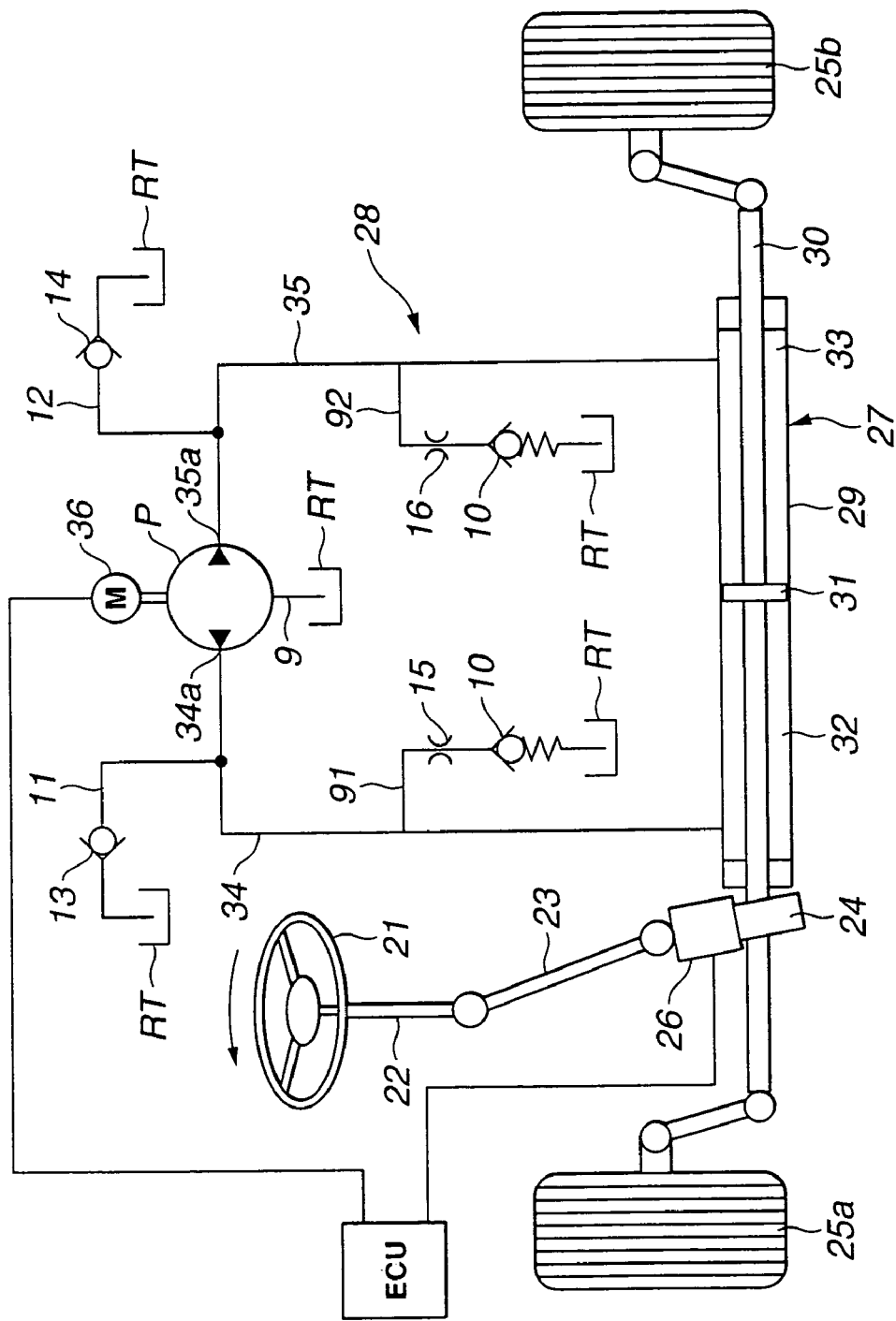
FIG. 5 is a hydraulic circuit diagram of a third embodiment of a power steering system according to the present invention.

FIG. 5 illustrates a third embodiment of the power steering control system according to the present invention, similar to the first embodiment power steering system. In this embodiment, no differential pressure regulating valve is disposed in drain passage 9. A differential pressure regulating valve 10 is disposed in a drain passage 91 for connecting first hydraulic line 34 and reservoir tank RT, and another differential pressure regulating valve 10 is disposed in another drain passage 92 for connecting second hydraulic line 35 and reservoir tank RT. Additionally, an orifice 15 is disposed in drain passage 91 upstream of differential pressure regulating valve 10. Another orifice 16 is disposed in drain passage 92 upstream of differential pressure regulating valve 10. Accordingly, it will be understood that similar effects to those in the first embodiment can be obtained.

Figure 6:
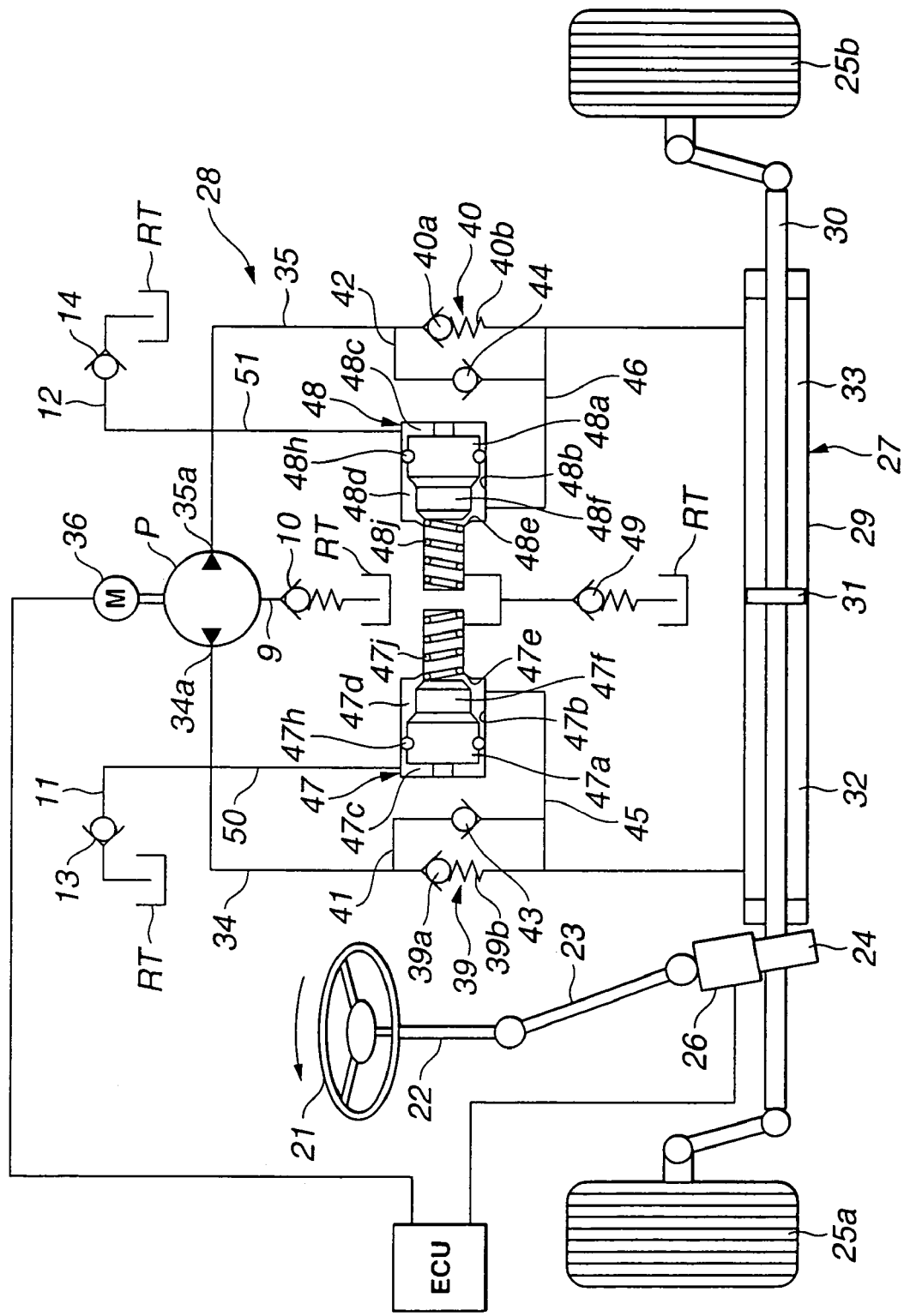
FIG. 6 is a hydraulic circuit diagram of a fourth embodiment of the power steering system according to the present invention.

FIG. 6 illustrates a fourth embodiment of the power steering control system according to the present invention, similar to the first embodiment power steering system. In this embodiment, a first pressure control valve 39 and a second pressure control valve 40 are respectively disposed in first hydraulic line 34 and second hydraulic line 35. A bypass communication passage 41 is connected to the first hydraulic line 34 in a manner to bypass first pressure control valve 39. A bypass communication passage 42 is connected to the second hydraulic line 35 in a manner to bypass second pressure control valve 40. A one-way valve 43 is disposed in bypass communication passage 41 to allow the hydraulic fluid to flow only in a direction of from the side of first hydraulic pressure chamber 32 to the side of the reversible pump P. A one-way valve 44 is disposed in bypass communication passage 42 to allow the hydraulic fluid to flow only in a direction of from the side of second hydraulic pressure chamber 33 to the side of the reversible pump P. A first bypass passage 45 is provided to connect a part of first hydraulic line 34 between the first pressure control valve 39 and the first hydraulic pressure chamber 32 with reservoir tank RT. A second bypass passage 46 is provided to connect a part of the second hydraulic line 35 between the second pressure control valve 40 and the second hydraulic pressure chamber 33 with reservoir tank RT.

A first normally opened poppet valve 47 is disposed in first bypass passage 45 and operated to interchangeably open or close bypass passage 45. In other words, the first bypass passage 45 is changed between its open state to allow the hydraulic fluid to flow through the first bypass passage and its closed state to block flow of the hydraulic fluid through the first bypass passage. A second normally opened poppet valve 48 is disposed in second bypass passage 46 and operated to interchangeably open or close bypass passage 46. In other words, the second bypass passage 46 is changed between its open state to allow the hydraulic fluid to flow through the second bypass passage and its closed state to block flow of the hydraulic fluid through the second bypass passage. First bypass passage 45 is connected with second bypass passage 46 to form a connected line (no numeral) to which an additional line (no numeral) is connected so that the connected line is communicable with the reservoir tank RT. A differential pressure regulating valve 49 is disposed in the additional line to allow the hydraulic fluid to flow only in a direction toward the reservoir tank RT.

More specifically, pressure control valve 39 includes a ball valve member 39a constituting a first check valve for allowing the hydraulic fluid to flow only in a direction of from the side of the reversible pump P to the side of hydraulic power cylinder 27. Additionally, a return spring 39b is provided to bias ball valve member 39a in a direction to close the first hydraulic line 34 under a certain load. Pressure control valve 40 includes a ball valve member 40a constituting a second check valve for allowing the hydraulic fluid to flow only in a direction of from the side of the reversible pump P to the side of hydraulic power cylinder 27. Additionally, a return spring 40b is provided to bias ball valve member 40a in a direction to close the second hydraulic line 35 under a certain load. Under the biasing force of return springs 39b, 40b, a pressure differential is developed between the side of hydraulic power cylinder 27 and the side of the reversible pump P.

First and second poppet valves 47, 48 are coaxially disposed and symmetrically located. First and second poppet valves 47, 48 are respectively formed with cylindrical valve bores 47b, 48b which are located coaxial with each other. Concerning first poppet valve 47, a generally column-like valve member 47a is slidably disposed in the valve bore 47b to define a pressure receiving chamber 47c located at the outer side and a communication chamber 47d located at the inner side. Communication chamber 47d at the inner side forms part of the first bypass passage 45 and is provided with a valve seat (no numeral) defining a valve opening 47e. A valve section 47f of valve member 47a is contactable with the valve seat so as to interchangeably open or close valve opening 47e thereby interchangeably open or close first bypass passage 45. Valve section 47f is provided with a slidable seal member 47h. Concerning second poppet valve 48, a generally column-like valve member 48a is slidably disposed in the valve bore 48b to define a pressure receiving chamber 48c located at the outer side and a communication chamber 48d located at the inner side. Communication chamber 48d at the inner side forms part of second bypass passage 46 and is provided with a valve seat (no numeral) defining a valve opening 48e. A valve section 48f of valve member 48a is contactable with the valve seat so as to interchangeably open or close valve opening 48e thereby interchangeably open or close second bypass passage 46. Valve section 48f is provided with a slidable seal member 48h.

A spring 47j is disposed in an inner side part of communication chamber 47d which inner side part is located on the inner side of the valve opening 47e. Spring 47j is adapted to bias valve member 47a in a direction far from valve opening 47e so as to normally open first bypass passage 45. A spring 48j is disposed in an inner side part of communication chamber 48d which inner side part is located on the inner side of the valve opening 48e. Spring 48j is adapted to bias valve member 48a in a direction far from valve opening 48e so as to normally open second bypass passage 46.

Pressure receiving chamber 47c of first poppet valve 47 at the outer side is connected through a first introduction passage 50 with a part of first hydraulic line 34 between pressure control valve 39 and the reversible pump P. In this connection, inner side communication chamber 47d opposite to outer side pressure receiving chamber 47c with respect to valve member 47a is connected through first bypass passage 45 with a part of first hydraulic line 34 between pressure control valve 39 and hydraulic power cylinder 27. As a result, under the action of pressure differential developed between the upstream and downstream sides of pressure control valve 39, valve member 47a is moved in such a direction that its valve section 47f contacts with the valve seat thereby closing valve opening 47e. Similarly, pressure receiving chamber 48c of second poppet valve 48 at the outer side is connected through a second introduction passage 51 with a part of second hydraulic line 35 between pressure control valve 40 and the reversible pump P. In this connection, inner side communication chamber 48d opposite to outer side pressure receiving chamber 48c with respect to valve member 48a is connected through second bypass passage 46 with a part of second hydraulic line 35 between pressure control valve 40 and hydraulic power cylinder 27. As a result, under the action of pressure differential developed between the upstream and downstream side of pressure control valve 40, valve member 47a is moved in such a direction that its valve section 48f contacts with the valve seat thereby closing valve opening 48e.

Operation of the fourth embodiment power steering control system will be discussed together with advantageous effects of the present invention.

Since the fourth embodiment of the power steering control system is arranged as discussed above, when the driver leftward turns steering wheel 21 as indicated by an arrows in FIG. 6, the control unit ECU outputs the control signal, for example, to control electric motor 36 to rightly rotate, so that the reversible pump P is driven to rightly rotate. Under the action of the thus rotating pump, a part of the hydraulic fluid discharged to the first hydraulic line 34 flows through first introduction passage 50 into pressure receiving chamber 47c. This part is higher in hydraulic pressure than the hydraulic fluid passed through the first pressure control valve 39 thereby to develop a pressure differential, and therefore valve body 47a of first poppet valve 47 is pushed rightward against the biasing force of spring 47j under the pressure differential. As a result, valve section 47f of valve member 47a is brought into contact with the valve seat thereby closing valve opening 47e. At this time, valve section 48f of valve member 48a of second poppet valve 48 is being separate from the valve seat under the biasing force of spring 48j thereby maintaining valve opening 48e in an open state.

Consequently, the hydraulic fluid discharged from reversible pump P pushes ball valve member 39a against the biasing force of return spring 39b so as to open first pressure control valve 39, and therefore the hydraulic fluid is supplied to first hydraulic pressure chamber 32 of hydraulic power cylinder 27. Simultaneously, the hydraulic fluid flowing from second hydraulic pressure chamber 33 to second hydraulic line 35 once flows into second bypass passage 46 and then is introduced into communication passage 42. Here, the introduced hydraulic fluid into communication passage 42 opens one-way valve 44, and then is again sucked through second hydraulic line 35 into the reversible pump P while the introduced hydraulic fluid is returned to the reservoir tank RT through communication chamber 48d forming part of second bypass passage 46.

Thus, the hydraulic fluid is supplied to first hydraulic fluid chamber 32 of hydraulic power cylinder 27 while the hydraulic fluid is discharged from second hydraulic pressure chamber 33 of hydraulic power cylinder 27. Accordingly, an assist force is applied to the driver's leftward steering effort for steering wheel 21, so that the load for leftward turning the steering wheel is lightened thereby improving the operationability of steering wheel 21.

When the residual pressure within hydraulic circuit 28 exceeds the valve opening pressure of differential pressure regulating valve 49, differential pressure regulating valve 49 opens thereby preventing the hydraulic line 28 from becoming into its overload condition. It will be understood that the valve opening pressure of this differential pressure regulating valve 49 is set at a value higher than the valve opening pressure of the above-mentioned differential pressure regulating valve 10.

Therefore, the fourth embodiment power steering system of the present invention can provide the same effects as those in the first embodiment power steering system and such an additional effect that, even in case that differential pressure regulating valve 10 is troubled, differential pressure regulating valve 49 operates thereby effectively preventing hydraulic line 28 from becoming into an overload condition.

Although the invention has been described above by reference to certain embodiments of the invention, the invention is not limited to the embodiments described above. Modifications and variations of the embodiments described above will occur to those skilled in the art, in light of the above teachings. For example, in the fourth embodiment power steering system of the present invention, although first bypass passage 45 and second bypass passage 46 are shown and described as being respectively connected to first hydraulic line 34 and second hydraulic line 35, it will be understood that first bypass passage 45 and second bypass passage 46 may be respectively directly connected to hydraulic pressure chambers 32, 33 of hydraulic power cylinder 27. Furthermore, while the pressure control valve has been shown and described as being used as means for developing a pressure differential, it will be appreciated that an orifice may be used as the same means.

As appreciated from the above, each of the above embodiment power steering systems comprises the first and second communication passages for connecting the hydraulic circuit with the reservoir tank, the hydraulic circuit including the first and second hydraulic pressure chambers of the hydraulic power cylinder, the first hydraulic line, the second hydraulic line, and the reversible pump. The one-way valve is disposed in the first communication passage to allow hydraulic fluid to flow in the direction of from the side of the reservoir tank to the side of the hydraulic circuit. The orifice is disposed in the second communication passage. Additionally, the differential pressure regulating valve is disposed in a part of the second communication passage between the orifice and the reservoir tank to allow hydraulic fluid to flow in the direction of from the side of the hydraulic circuit to the side of the reservoir tank. As a result, since the differential pressure regulating valve is opened at the valve opening pressure which has been previously set at a certain value so as to release the hydraulic pressure to the side of the reservoir tank, the hydraulic circuit can be prevented from becoming into an overload condition. Besides, a driving energy for the reversible pump can be decreased while preventing the hydraulic circuit from becoming to an overload condition.

Furthermore, the inside of the first and second hydraulic pressure chambers of the hydraulic power cylinder are maintained at the valve opening pressure of the differential pressure regulating valve, and therefore fluctuation of operation of the hydraulic power cylinder is suppressed during non-steering assisting while an operational response of the hydraulic power cylinder is improved during steering assisting. This improves the stability of steering even upon input of kickback to the hydraulic power cylinder from road surface while improving a response of the steering assisting.

Moreover, the second communication passage is formed in a condition to establish communication between the pump chamber of the reversible pump and the reservoir tank, and the orifice is constituted by sliding clearances formed in the operating section of the reversible pump. As a result, the sliding clearances formed around the end faces of gears and inherently making leak of the hydraulic fluid inevitably from the structural viewpoint can be effectively used as the orifice. This makes it unnecessary to provide a particular orifice and a particular orifice passage thereby lowering the cost for the power steering system. Since the above-mentioned differential pressure regulating valve is disposed on the downstream side of the sliding clearances, the amount of leak of hydraulic fluid from the pump chamber of the reversible pump can be decreased. In case that the inside of the reversible pump becomes in an overload condition, the differential pressure regulating valve is opened thereby preventing overload from being applied to seal members and the like of the reversible pump.

Hereinafter, a fifth embodiment of the power steering system according to the present invention will be discussed with reference to FIG. 7.

In this embodiment, the power steering system comprises a steering shaft 102 on which a steering wheel 101 is fixedly mounted as a steering effort input means. A rack and pinion steering gear 103 is connected to the lower end portion of steering shaft 102 and forms part of a steering mechanism. A detector 104 is provided at the lower end side of steering shaft 102 to detect a torque input to steering wheel 101 and a road surface input from road wheels (not shown). The detector 104 is adapted to output detection signals representative of the torque and the road surface input. A hydraulic power cylinder 105 is connected to rack and pinion steering gear 103. The hydraulic power cylinder 105 is connected to a main part of a hydraulic circuit 106 through which hydraulic fluid is supplied to or discharged from hydraulic power cylinder 105 in accordance with the detection signals from detector 104.

Hydraulic power cylinder 105 includes a cylinder section 107 which extends in the direction of width of a vehicle body. A piston rod 108 is axially disposed inside cylinder section 107 and connected to rack and pinion gear 103. A piston 109 is fixed to piston rod 108 so as to slidably axially move in cylinder section 107. This piston 109 defines a first hydraulic pressure chamber 110 and a second hydraulic pressure chamber 111 which are located respectively on left and right sides of the piston.

Hydraulic circuit 106 includes a reversible oil pump 113, and first and second hydraulic lines 114, 115. Reversible oil pump 113 serves as a hydraulic pressure source and is driven to be rightly and reversely rotatable or in both right and reverse directions (i.e., rotatable in a first direction and a second direction opposite to the first direction) under drive of an electric motor (as a driving device or means) 102 connected to pump 113. Oil pump 113 has two suction and discharge ports (no numerals) which are respectively connected to the first and second hydraulic pressure chambers 110, 111 of hydraulic power cylinder 107 respectively through first and second hydraulic lines 114, 115. An intermediate section of each of first or second hydraulic line 114, 115 includes a supply passage 116 through which the hydraulic fluid is introduced from the side of oil pump 113 to the side of hydraulic pressure chamber 110, 111 of hydraulic power cylinder 107, and a return passage 117 through which the hydraulic fluid is returned from the side of hydraulic pressure chamber 110, 111 of hydraulic power cylinder 107 to the side of the suction and discharge port of the oil pump 113, supply and return passages 116, 117 being connected in parallel with each other.

Each return passage 117 of first and second hydraulic lines 114, 115 is provided with a differential pressure regulating valve 118 which functions to allow the hydraulic fluid to flow only in the direction of oil pump 113 when the pressure at the side of hydraulic pressure chamber 110, 111 becomes higher a set pressure than the pressure at the side of oil pump 113. A branch passage 117a is connected to an upstream-side section (located at the side of hydraulic pressure chamber 110, 111) of each return passage 117, so that the branch passages 117a, 117a of first and second hydraulic lines 114, 115 are connected with each other through a bypass passage 120.

A flow passage change-over device 122 is disposed in supply passage 16 of each of first and second hydraulic lines 114, 115 in such a manner as to bridge or connect supply passage 16 and the above-mentioned branch passage 117a. This flow passage change-over device 122 basically functions to close bypass passage 120 when the operation of hydraulic power cylinder 105 is made under the action of oil pump 113 and to open bypass passage 120 when the operation of hydraulic power cylinder 105 is not made without the action of oil pump 113. Flow passage change-over device 122 is generally arranged such that a valve member 124 and a return spring 125 are accommodated in a valve chamber 123 through which supply passage 116 and branch passage 117a are communicable with each other. Valve member 124 functions to open or close the end portion of each of supply passage 116 and bypass passage 120. Return spring 125 functions to bias valve member 124 in a direction to open bypass passage 120. In this embodiment, valve member 124 is not a one-piece block-shaped body and therefore includes first and second valve members 126, 127 which can be independently movable from each other. A coil spring 128 as an elastic member is disposed between first and second valve members 126, 127 to connect the first and second valve members.

Both flow passage change-over devices 122, 122 in first and second hydraulic lines 114, 115 are generally symmetrically located so as to have respectively end sections (referred hereafter to as "front end section") which are opposite to each other. An opposite end section of each flow passage change-over device 122 to the front end section is referred to as "rear end section". A part of bypass passage 120 is formed inside the front end section of flow passage change-over device 122 and is communicable with valve chamber 123. Both bypass passages 120, 120 of both flow passage change-over devices 122, 122 are connected with each other. The end portion of branch passage 117a is opened to valve chamber 123 at a position closer to the front end section. An upstream-side port 116a and a downstream-side port 116b of supply passage 116 are formed in valve chamber 123 at positions closer to the rear end section. Downstream-side port 116b is located offset a certain distance toward the front end section relative to upstream-side port 116a within valve chamber 123.

Here, first valve member 126 of flow passage change-over device 122 is adapted to establish and interrupt communication between upstream-side port 116a and downstream-side port 116b of supply passage 116, while second valve member 127 is adapted to open and close the end portion of bypass passage 120. A pressure (the pressure of oil pump 112) at upstream-side port 116a always acts on the rear end section of valve member 126, while a pressure (the pressure of hydraulic pressure chamber 110, 111) in branch passage 117a of return passage 117 always acts on the front end section of second valve member 27. Additionally, coil spring 28 disposed between first valve member 126 and second valve member 127 is higher in spring constant than return spring 125, so that both valve members 126, 127 are displaced toward the front end section as a one-piece body when the pressure at upstream-side port 116a and acting on first valve member 126 becomes higher a set value than the pressure at branch passage 117a and acting on second valve member 127. However, after second valve member 127 closes bypass passage 120 so as to be restricted in its forward movement, first valve member 126 singly moves forward compressing coil spring 128. In this state, when this valve member 126 moves forward a set distance, valve member 126 opens downstream-side port 116b.

It will be understood that motor 112 for rightly and reversely rotating oil pump 113 is controlled in accordance with the detection or operation signals from the above-mentioned detector 104, a signal representative of a vehicle speed and like signal, under control of a controller or electronic control unit 129.

Operation of this embodiment power steering system will be discussed.

For example, during vehicle straight driving in which a torque of a set value or higher is not input to steering wheel 101, no operation signal is input to motor 112 so that oil pump 113 is in an inoperative state. At this time, the pressure at a rear side of first valve member 126 and the pressure at a front side of second valve member 127 are approximately equal to each other in each flow passage change-over device 122 in the first and second hydraulic lines 114, 115, and therefore both valve members 126, 127 are moved backward under the biasing force of return spring 125 thereby to close supply passage 116 and open bypass passage 120. Consequently, each supply line 116 of first and second hydraulic lines 114, 115 and each return passage 117 are completely closed by first valve member 126 and differential pressure regulating valve 118, so that, in this state, both hydraulic pressure chambers 110, 111 of hydraulic power cylinder 105 are communicated with each other through bypass passage 120. By this, hydraulic power cylinder 105 is brought into a freely operable condition, thereby enabling light steering operation to be made by the driver within an operational range in which no input torque can be detected by detector 104.

At this time, a part of the hydraulic circuit near hydraulic power cylinder 105 is formed by closing the passages on the side of oil pump 113 with first valve member 126 and differential pressure regulating valve 118 and by opening bypass passage 120, so that the part of the hydraulic circuit is maintained at a rather high pressure under the function of differential pressure regulating valve 118 at the side of return passage 117. This does not impede the driver's light steering operation and can provide a suitable reaction to the driver around a neutral position in steering thereby stabilizing the steering operation even when kickback or the like is input to the hydraulic power cylinder 105 from road surface.

When the driver turns steering wheel 101 rightward or leftward from the above-mentioned condition so that the input torque to steering wheel 101 exceeds the set value or higher, the input torque is detected by detector 104 thereby to cause the controller 129 to output control signals. In accordance with these control signals from the controller 129, motor 112 is rotated in one direction (right or reverse direction) so that oil pump 113 is driven to rotate in the corresponding direction. At this time, for example, in case that the hydraulic fluid is discharged to the side of first hydraulic line 114, the pressure of the hydraulic fluid acts on the rear side of first valve member 126 of flow passage change-over device 122 through upstream-side port 116a of supply passage 116. If this pressure of the hydraulic fluid becomes higher a set value or higher than the pressure (the pressure in first hydraulic pressure chamber 110 of hydraulic power cylinder 105) in the branch passage 117a and acting on the front side of second valve member 127 so as to develop a pressure differential, first and second valve members 126, 127 move forward under the action of the pressure differential, so that first valve member 126 opens supply passage 116 after second valve member 127 closes bypass passage 120 thereby allowing the hydraulic fluid from oil pump 113 to be introduced into first hydraulic pressure chamber 110 of hydraulic power cylinder 105. At this time, the hydraulic fluid from oil pump 113 is flown into the downstream side of supply passage 116 so that the pressure on the side of first hydraulic pressure chamber 110 rises, in which the pressure in first hydraulic pressure chamber 110 momentarily rises since the pressure on the side of first hydraulic pressure chamber 110 is maintained at the rather high level during the non-steering assisting as discussed above.

On the other hand, at this time, the hydraulic fluid in second hydraulic pressure chamber 111 of hydraulic power cylinder 105 flows through return passage 117 of second hydraulic line 115 and opens differential pressure regulating valve 118 so as to be sucked into oil pump 113.

Accordingly, a hydraulic power according to the input torque is developed in hydraulic power cylinder 105 and assists the steering for the road wheels. It will be understood that, when steering wheel 101 is reversely turned, motor 112 and oil pump 113 rotate in the reverse direction relative to that in the above-mentioned operation, so that the respective valve members in first or second hydraulic lines 114, 115 function in a similar manner to that discussed above, in which the hydraulic fluid from oil pump 113 is introduced into second hydraulic pressure chamber 111 of hydraulic power cylinder 105. At this time, the hydraulic fluid in first hydraulic pressure chamber 110 of hydraulic power cylinder 105 flows through return passage 117 of first hydraulic line 114 and opens differential pressure regulating valve 118 so as to be sucked into oil pump 113. Thus, hydraulic power cylinder 105 operates in a reverse direction relative to the above.

It is to be noted that, in this embodiment power steering system, the pressure on the side of hydraulic power cylinder 105 is maintained at the rather high level during the non-steering assisting, and therefore the pressure in hydraulic pressure chambers 110, 111 of hydraulic power cylinder 105 momentarily rises. This enables a smooth steering assisting to be made without a response delay or the like thereby largely improving a steering feeling for the driver.

Figure 7:
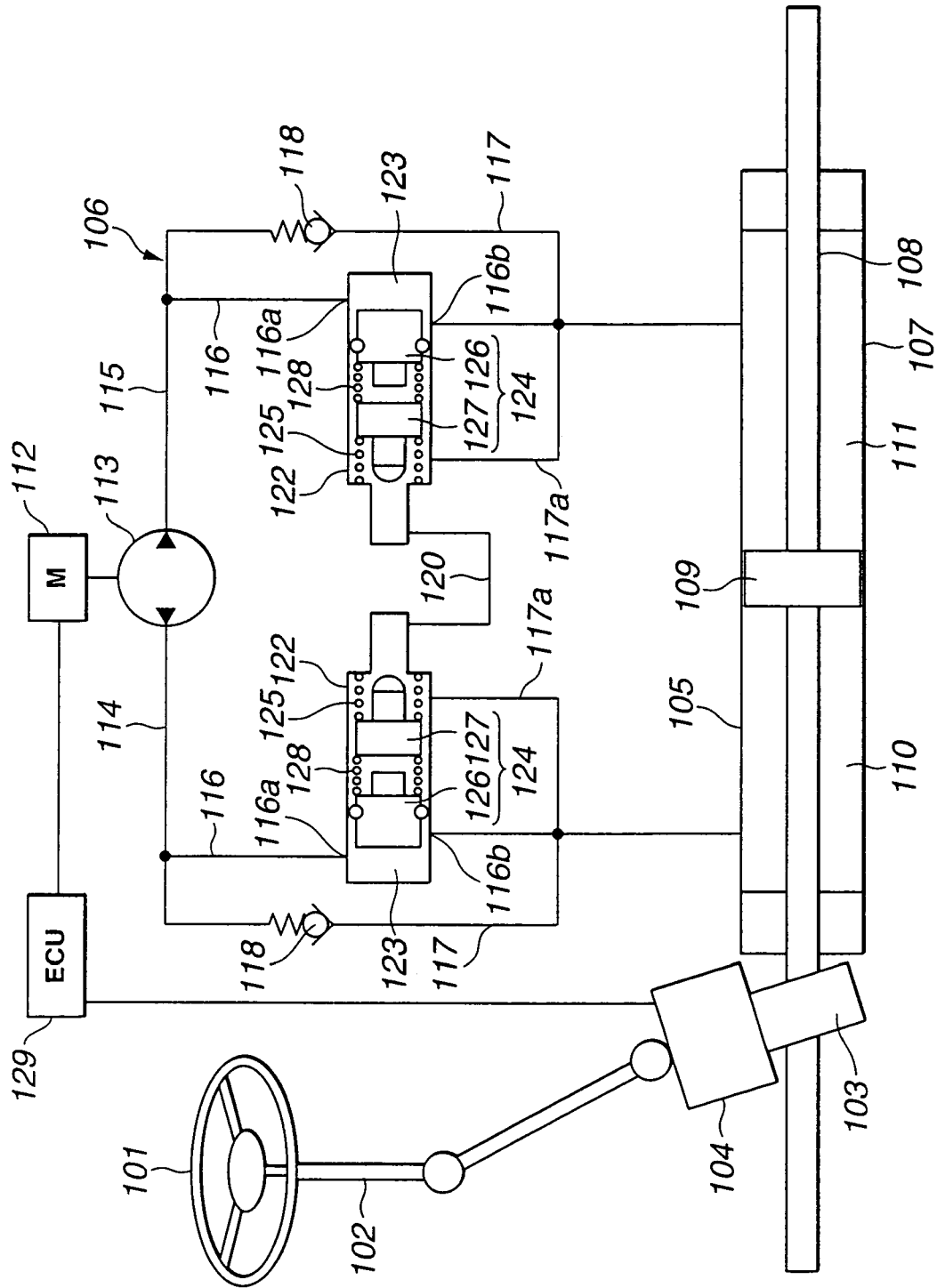
FIG. 7 is a hydraulic circuit diagram of a fifth embodiment of the power steering system according to the present invention.
Figure 8:
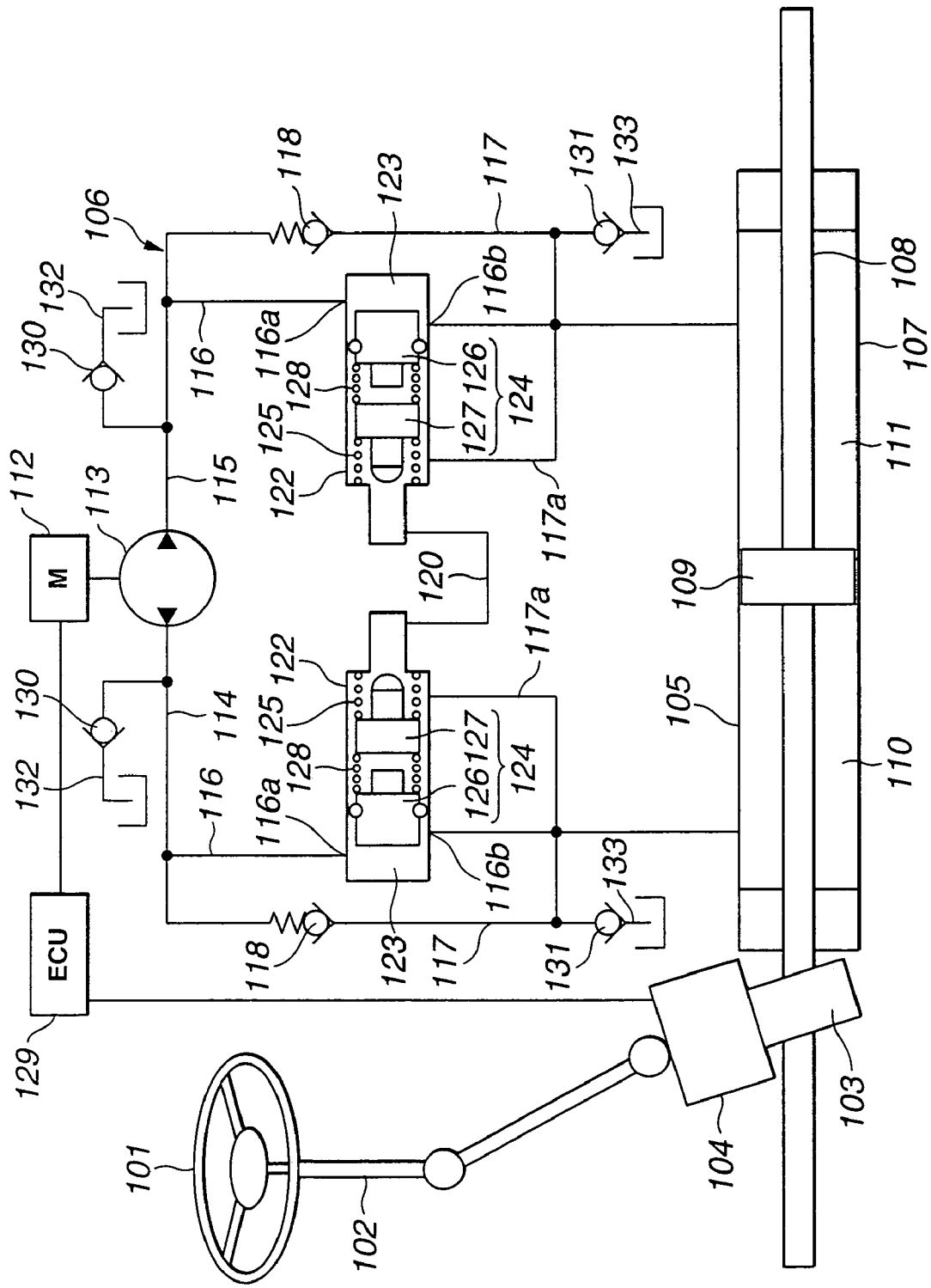
FIG. 8 is a hydraulic circuit diagram of a sixth embodiment of the power steering system according to the present invention.

FIG. 8 illustrates a sixth embodiment of the power steering system according to the present invention, similar to the fifth embodiment power steering system of FIG. 7 with the exception that a reservoir passage 132 provided with a one-way valve 130 is connected to each hydraulic line 114, 115 at a part close to oil pump 113, and a reservoir passage 133 provided a one-way valve 131 is connected to branch passage 117a of each return passage 117. In case of this embodiment, the similar effects to those in the fifth embodiment can be basically obtained. Additionally, shortage of the hydraulic fluid at the upstream side in the first and second hydraulic lines at an initial time of operation can be securely compensated with the hydraulic fluid from reservoir passages 132, while shortage of the hydraulic fluid at the downstream side in first and second hydraulic lines, for example, due to abrupt change in turning direction of steering wheel 101 can be similarly compensated with the hydraulic fluid from reservoir passages 133, 133.

Figure 9:
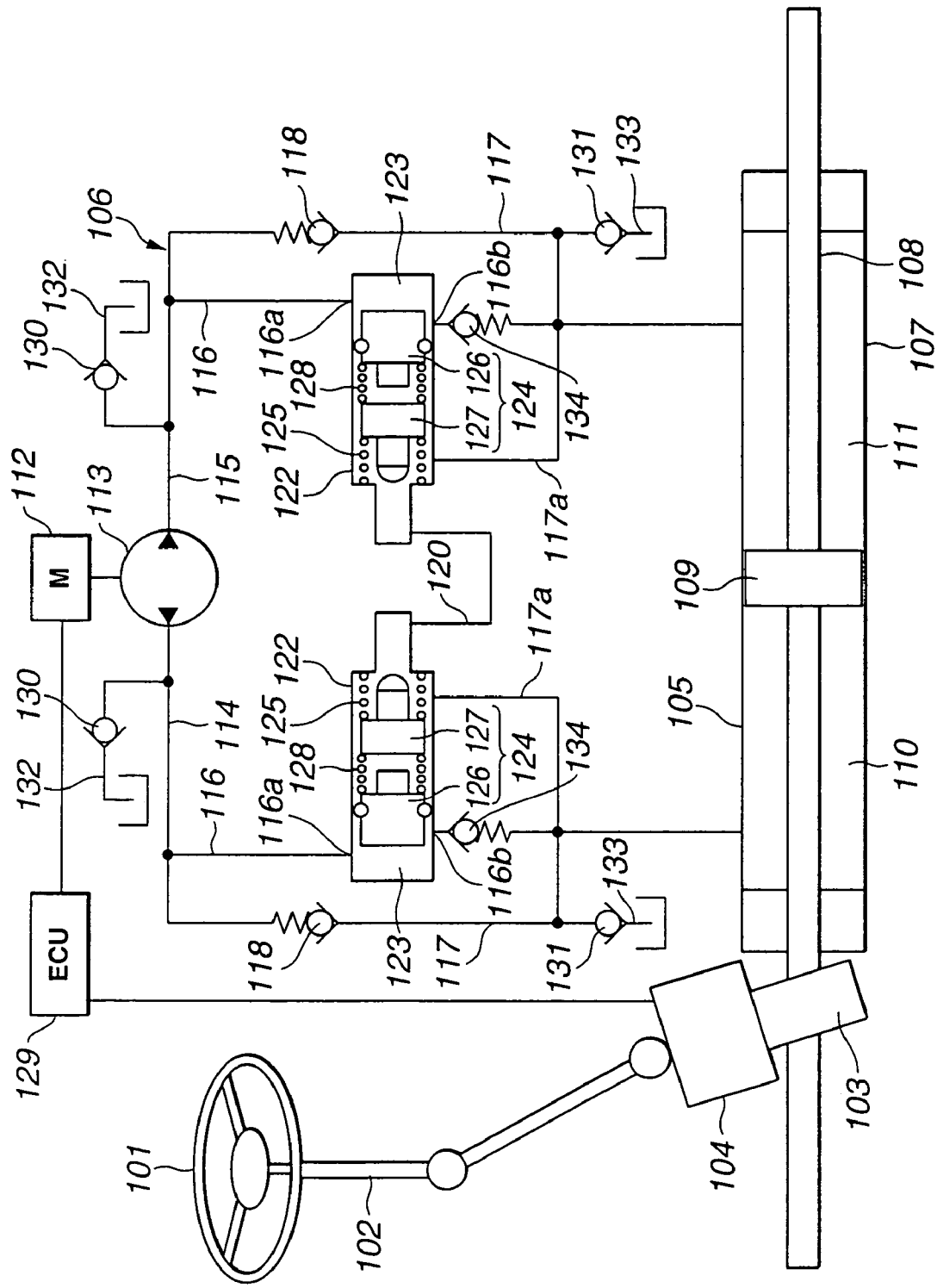
FIG. 9 is a hydraulic circuit diagram of a seventh embodiment of the power steering system according to the present invention.

FIG. 9 illustrates a seventh embodiment of the power steering system according to the present invention, similar to the sixth embodiment power steering system of FIG. 8 with the exception that another differential pressure regulating valve 134 as a one-way valve is disposed in a part of each of supply lines 116, 116 downstream of flow passage change-over device 122, 122. This differential pressure regulating valve 134 securely prevents the hydraulic pressure from releasing from the side of each hydraulic pressure chamber 110, 111 of hydraulic power cylinder 105 through supply passage 116 and flow passage change-over device 122 to the side of oil pump 113 during the non-steering assisting. While this differential pressure regulating valve 134 may be basically a one-way valve having no check spring, it will be appreciated that release of the hydraulic pressure can be further securely prevented by using differential pressure regulating valve 134 in this embodiment.

Figure 10:
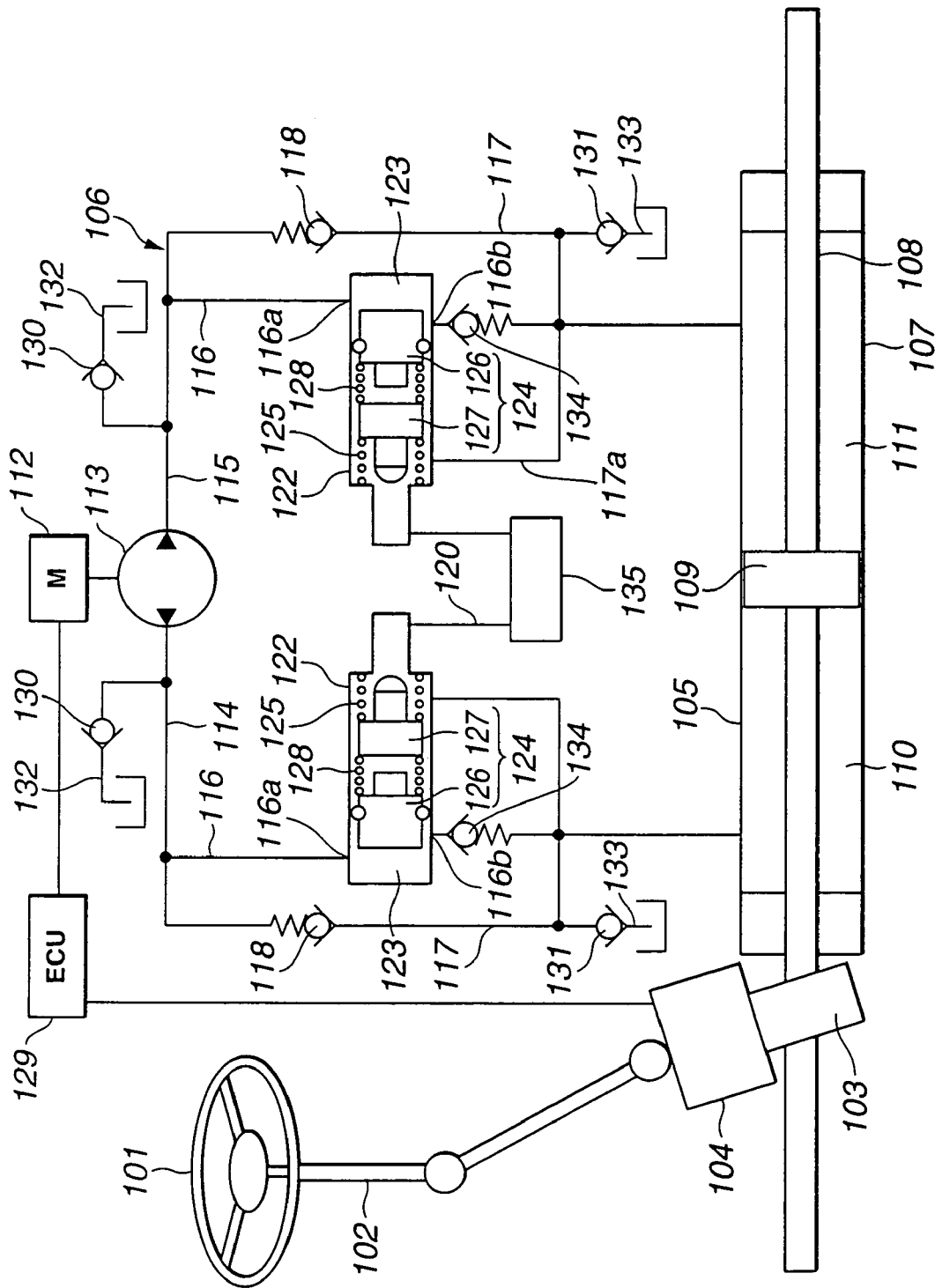
FIG. 10 is a hydraulic circuit diagram of an eighth embodiment of the power steering system according to the present invention.

FIG. 10 illustrates an eighth embodiment of the power steering system according to the present invention, similar to the seventh embodiment power steering system of FIG. 9 with the exception that a volume chamber 135 having a certain volume or larger is disposed in a generally middle part of bypass passage 120. In case of this embodiment, even if a hydraulic pressure fluctuation is generated at the side of one of hydraulic lines 114, 115, the fluctuation can be absorbed by the volume chamber 135 located in the generally middle part of bypass passage 120, thereby preventing the baneful influence due to the pressure fluctuation from being applied through bypass passage 120 to the other of hydraulic lines 114, 115.

Figure 11:
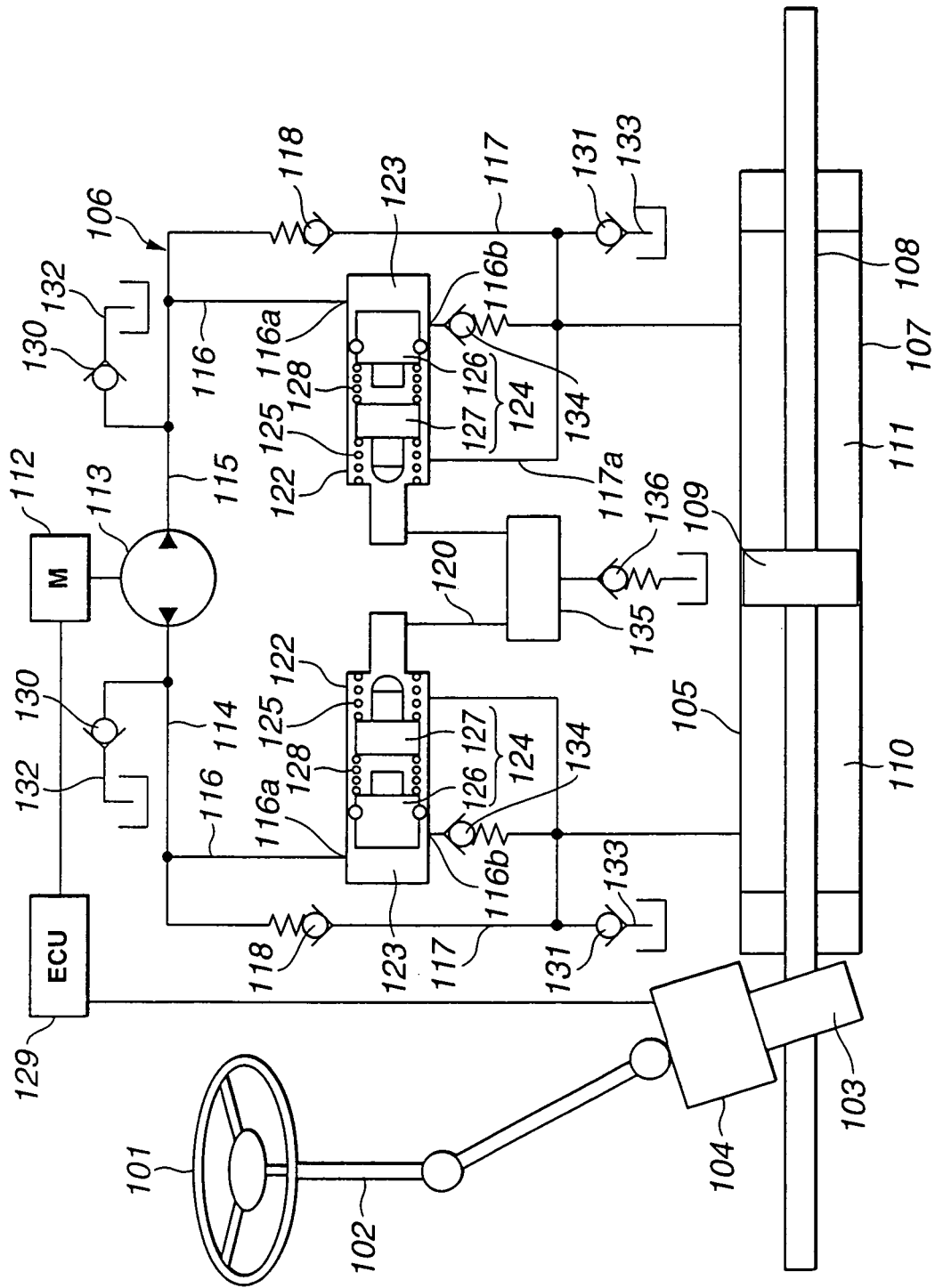
FIG. 11 is a hydraulic circuit diagram of a ninth embodiment of the power steering system according to the present invention.

FIG. 11 illustrates a ninth embodiment of the power steering system according to the present invention, similar to the eighth embodiment power steering system of FIG. 10 with the exception that a relief valve 136 is provided to volume chamber 135. This relief valve 136 is adapted to open to release the hydraulic pressure when the maintained pressure in a part of the hydraulic circuit at the side of hydraulic power cylinder 105 rises over a set level owing to temperature rise or the like during the non-steering assisting or the like, thereby preventing the hydraulic pressure within the hydraulic circuit from abnormally rising. In case of this embodiment, while relief valve 136 is provided to be connected to volume chamber 135, it will be understood that relief valve 136 may be disposed at other positions in a part (whose pressure is maintained by differential pressure regulating valve 118) of the hydraulic circuit on the side of hydraulic power cylinder 105.

While the invention has been described above by reference to the fifth to eighth embodiments of the invention, the invention is not limited to the embodiments described above. Modifications and variations of the embodiments described above will occur to those skilled in the art, in light of the above teachings. For example, while valve member 124 forming part of flow passage change-over device is constituted of first valve member 126 and second valve member 127 which are independently movable from each other, it will be understood that valve member 124 may be constituted of a one-piece block member.

As appreciated from the above, according to the fifth to eighth embodiments of the present invention, by virtue of the differential pressure regulating valve disposed in the return passage of each of the first and second hydraulic lines, the pressure at the upstream side of the differential pressure regulating valve is always maintained at a set level, so that the pressure of each hydraulic pressure chamber of the hydraulic power cylinder is maintained at a rather high level. This makes it possible to securely prevent operational fluctuation of the hydraulic power cylinder during the non-steering assisting while hastening rise of internal pressure within the hydraulic circuit during the steering assisting thereby improving the operational response of the hydraulic power cylinder. Hence, according to the embodiments of the present invention, steering stability during the non-steering assisting is improved while improving response of steering assisting, thus improving the driver's steering feeling as a whole.

The entire contents of Japanese Patent Application No. 2002-076009, filed Mar. 19, 2002 and Japanese Patent Application No. 2002-77413, filed Mar. 20, 2002 are incorporated herein by reference.

What is claimed is:

1. A power steering system comprising:
   a hydraulic power cylinder including a piston for defining first and second hydraulic pressure chambers, hydraulic fluid being supplied to or discharged from each of the first and second hydraulic chambers under action of a hydraulic pressure source to hydraulically operate the piston so as to accomplish steering assisting;
   first and second hydraulic lines which are respectively connected to first and second hydraulic pressure chambers of the hydraulic power cylinder, the first and second hydraulic lines being connected to the hydraulic pressure source;
   a bypass passage through which the first and second hydraulic lines are connected with each other;
   a flow passage change-over device adapted to close the bypass passage during steering assisting under the action of the hydraulic pressure source and to open the bypass passage during non-steering assisting;
   wherein a supply passage and a return passage are disposed in parallel with each other to form part of each of the first and second hydraulic lines, the supply passage and the return passage being connected to the hydraulic pressure source and to each of the first and second hydraulic pressure chambers of the hydraulic power cylinder,
   wherein the flow passage change-over device is disposed in each of the first and second hydraulic lines, the flow passage change-over device including a valve member which is adapted to open or close each of the supply passage and the bypass passage in accordance with a pressure differential between pressure at side of the hydraulic pressure source and pressure at side of the hydraulic power cylinder in the hydraulic pressure line in which the flow passage change-over device is disposed,
   wherein a differential pressure regulating valve is disposed in each of the return passages and adapted to allow hydraulic fluid to flow toward the hydraulic pressure source in a condition where pressure on side of the hydraulic power cylinder becomes higher a set pressure or higher than pressure on side of the hydraulic pressure source.

2. A power steering system as claimed in claim 1, wherein a one-way valve is disposed in each of the supply passages downstream of the flow passage change-over device and adapted to allow hydraulic fluid to flow only in a direction from side of the hydraulic pressure source to side of the hydraulic power cylinder.

3. A power steering system as claimed in claim 1, wherein a volume chamber is disposed in the bypass passage.

4. A power steering system as claimed in claim 1, wherein a relief valve is disposed in a part of the hydraulic circuit which part includes a region of the hydraulic circuit upstream of the differential pressure regulating valve, and the bypass passage, the relief valve being adapted to release pressure in a condition where pressure within the part of the hydraulic circuit becomes a set level or higher.

* * * * *